United States Patent
Heise

(10) Patent No.: US 9,450,713 B2
(45) Date of Patent: Sep. 20, 2016

(54) RETRANSMITTING DATA WITH TIME-MARKER INFORMATION

(75) Inventor: Bernd Heise, Munich (DE)

(73) Assignee: LANTIQ BETEILIGUNGS-GMBH & CO. KG, Neubiberg (DE)

(*) Notice: Subject to any disclaimer, the term of this patent is extended or adjusted under 35 U.S.C. 154(b) by 1755 days.

(21) Appl. No.: 12/500,592

(22) Filed: Jul. 9, 2009

(65) Prior Publication Data

US 2010/0042883 A1 Feb. 18, 2010

Related U.S. Application Data

(60) Provisional application No. 61/088,021, filed on Aug. 12, 2008.

(51) Int. Cl.
| | |
|---|---|
| H04L 1/08 | (2006.01) |
| H04L 1/18 | (2006.01) |
| H04L 1/00 | (2006.01) |
| H03M 13/00 | (2006.01) |

(52) U.S. Cl.
CPC ........... H04L 1/1874 (2013.01); H04L 1/1896 (2013.01)

(58) Field of Classification Search
None
See application file for complete search history.

(56) References Cited

U.S. PATENT DOCUMENTS

| | | | | |
|---|---|---|---|---|
| 2002/0146010 | A1* | 10/2002 | Shenoi et al. | 370/395.1 |
| 2002/0194343 | A1* | 12/2002 | Shenoi et al. | 709/227 |
| 2005/0286424 | A1* | 12/2005 | Peeters et al. | 370/235 |
| 2008/0062872 | A1 | 3/2008 | Christiaens et al. | |
| 2008/0063007 | A1* | 3/2008 | Christiaens et al. | 370/458 |
| 2008/0165838 | A1* | 7/2008 | Vanderhaegen et al. | 375/224 |
| 2009/0207985 | A1* | 8/2009 | Cioffi et al. | 379/93.01 |
| 2010/0005360 | A1* | 1/2010 | Begen et al. | 714/751 |
| 2010/0070817 | A1* | 3/2010 | Heise | 714/749 |
| 2011/0264978 | A1* | 10/2011 | Pons et al. | 714/751 |
| 2011/0314350 | A1* | 12/2011 | Christiaens et al. | 714/749 |
| 2012/0117273 | A1* | 5/2012 | Averi et al. | 709/248 |
| 2012/0201256 | A1* | 8/2012 | Heise et al. | 370/474 |

FOREIGN PATENT DOCUMENTS

WO WO 2007143277 A2 * 12/2007 ............. H04L 12/56

OTHER PUBLICATIONS

ITU-T G.998.4, Improved impulse noise protection for DSL transceivers, section 8.1.5, Jun. 2010.*

* cited by examiner

*Primary Examiner* — Justin R Knapp
(74) *Attorney, Agent, or Firm* — Eschweiler & Associates, LLC

(57) ABSTRACT

One implementation may include generating at a DSL transmitter time-marker information for a data unit, storing the time-marker information at the DSL transmitter, transmitting the data unit from the DSL transmitter to a DSL receiver, transmitting a request for retransmission from the DSL receiver to the DSL transmitter, and based on the request, retransmitting the data unit including the time-marker information from the DSL transmitter to the DSL receiver.

16 Claims, 8 Drawing Sheets

RETRANSMITTING DATA WITH TIME-MARKER INFORMATION

REFERENCE TO RELATED APPLICATIONS

This application claims the benefit of the priority date of U.S. provisional application 61/088,021 filed on Aug. 12, 2008, the content of which is herein incorporated by reference.

Modern data communication systems such as DSL communication systems transmit a plurality of different data types. Data of high-quality services such as IPTV services or video services require an efficient noise protection since missing data often provide strong disturbances of these services. Present impulse noise protection with Reed Solomon coding and interleaving provide not sufficient protection for these high-quality services.

Retransmission schemes have been introduced to address noise protection for high-quality services as well as other services. In retransmission, data transmitted over a communication link such as a subscriber line is stored at the transmitter site for some time. In case the receiver site receives corrupt data or data is missing at the receiver, for example when an impulse noise occurs, the transmitter site retransmits the data based on a request from the receiver again over the communication link. In order to provide high security for the transmission, an implemented retransmission scheme should be reliable and secure for situations occurring during the operation of the system.

DETAILED DESCRIPTION

The following detailed description explains exemplary embodiments of the present invention. The description is not to be taken in a limiting sense, but is made only for the purpose of illustrating the general principles of embodiments of the invention while the scope of protection is only determined by the appended claims.

In the various figures, identical or similar entities, modules, devices circuits etc. may have assigned the same reference number.

Figure 1:
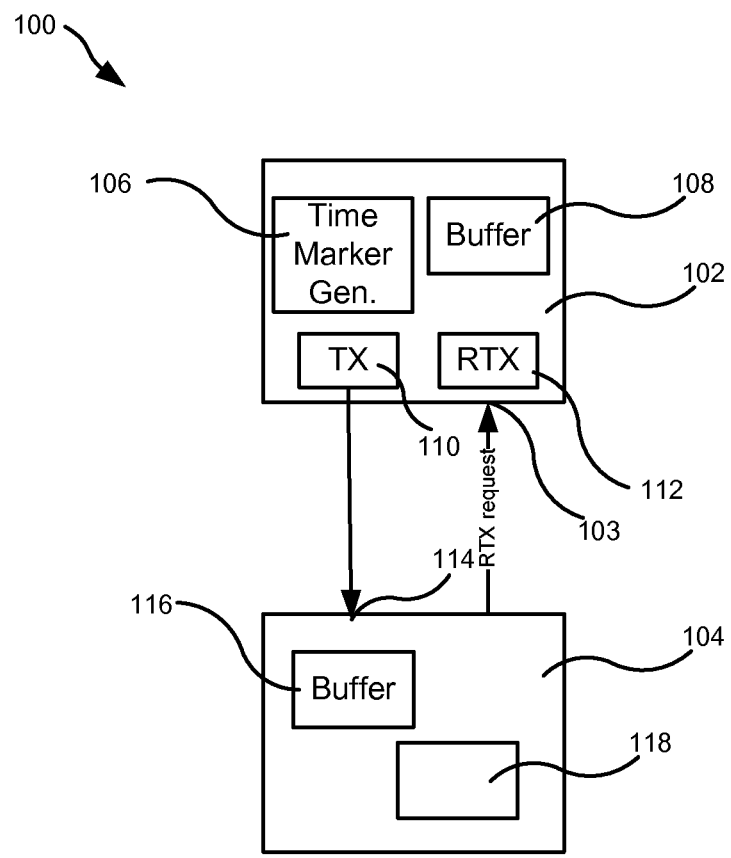
FIG. 1 shows a block diagram according to an embodiment of the present invention.

FIG. 1 shows an exemplary embodiment of a data communication system 100. The data communication system has a first device 102 implemented as transmitter and a second device 104 implemented as transmitter. The devices 102 and 104 can be implemented as transceiver i.e. may in an embodiment be capable of transmitting and receiving. The devices 102 and 104 may be a chip, a circuit implemented on a chip, a chip including hardware, firmware or software, a receiver/transmitter box or any other kind of other devices used in communication. In one embodiment, the data communication system is a DSL (digital subscriber line) system such as for example a VDSL (very high DSL) system. However in other embodiments the data communication system may be of other types.

Referring to FIG. 1, the device 102 includes a first entity 106 to generate time-marker information indicating a time-marker or timestamp for a data unit (fragment). As will be described in more detail below, the time-marker be any information which is capable to indicate a point of time for example a point in time when the data unit passes a predetermined point in the process flow. The time basis for the time-marker information may be based on data bits which are transmitted from the transmitter to the receiver. In one embodiment a time unit of the time basis is a number of data bits transmitted from the transmitter to the receiver. In other words, a counter which provides the time basis counts each time the number of data bits has been transmitted. In one embodiment, a time unit of the time basis may be each transmitted FEC codeword. In this case, the number of data bits would be the number of data bits contained in one FEC codeword. In one embodiment, the time unit is each transmitted multicarrier symbol. In this embodiment, the number would be correspond to the actual configured number of bits the multicarrier symbol contains. The number defining the time basis may be configured and may be reconfigured. The time unit may also vary such that the actual time between two successive time units varies, for example when a bit rate for the link is configured in a reconfiguration. In other words, the time basis may in embodiments not provide a time basis with equal time distances but may include varying time distances between each time unit. The data unit (data block) may in embodiments include an ATM cell, a packet, a fragment of a packet such as a fragment of an Ethernet packet, a frame, a data word or code word, a multicarrier symbol, a data block including one or more codewords which may also be interleaved FEC codewords etc. A buffer 108 is provided to store the time-marker information at the device 102.

Furthermore, a transmission entity 110 is provided to initiate transmission of the data unit. Initiating may include providing the data unit to a lower sublayer in order to further process the data unit for transmission over a link or to provide the data unit to a transmission circuit including transformers coupled to the link etc.

The device 102 has an input 103 to receive a request for retransmission of the data unit from the device 104. A retransmission entity 112 is provided in the device 102 to initiate based on the received retransmission request a retransmission of the data unit and the time-marker information. To this end, the time-marker information which is transmitted to the receiver may be incorporated, appended, added or otherwise linked to the retransmitted data unit in order to establish a link between the time-marker information and the data unit. In one embodiment, the time-marker information may be added to a special field of the data unit. In other embodiments the time-marker information may be transferred separate from the data unit wherein the data unit or the time-marker information contains link information to establish a link between the data unit and the time-marker information.

Initiating the retransmission may include a transferring of the data unit including the time-marker information to a lower sublayer in order to further proceed in the transmission process or to transfer the data unit including the time-marker information to a transmission circuit etc.

The device 104 has an input 114 to receive the data unit transmitted from the device 102 to the device 104. A buffer 116 is coupled to the input 114 to store the received data unit. Furthermore an entity 118 is provided in the device 104 to determine a point in time for transferring the data unit to a higher sublayer in a processing flow of the device 104. In embodiments, the entity 118 is configured to calculate the point in time based on a time base derived from a sequence numbering of multicarrier symbols or from a sequence numbering of FEC codewords as will be described in more detail below.

Figure 2:
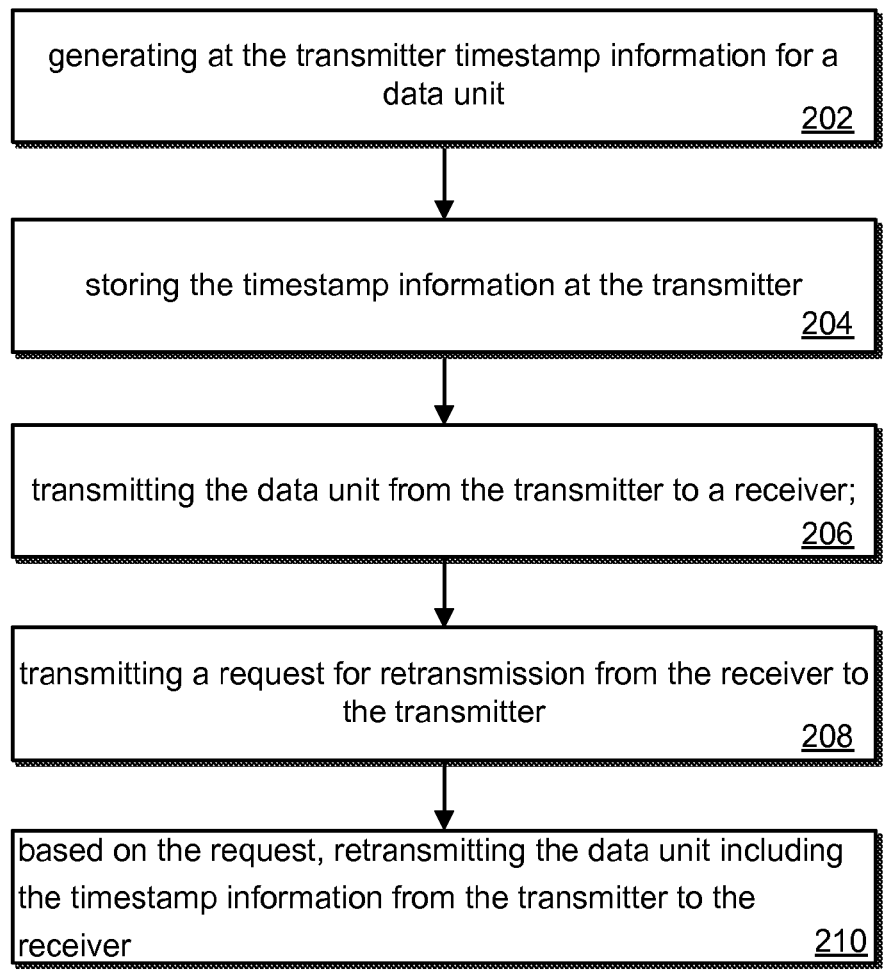
FIG. 2 shows a flow chart diagram according to an embodiment of the present invention.

An exemplary operation according to an embodiment which may for example be carried out by the system described in FIG. 1 will be described with respect to FIG. 2. FIG. 2 shows at 202 a generating of time-marker information for a data unit at the transmitter. At 204, the time-marker information is stored at the transmitter. The data unit is transmitted at 206 from the transmitter to the receiver. At 208, a request for retransmission is transmitted from the receiver to the transmitter. The request for retransmission may indicate in one embodiment directly the retransmission of the data unit. In another embodiment, the request may indicate the retransmission of a group of data units wherein the indicated group includes the one data unit. The retransmission request may in embodiments be generated based on detection that the transmitted data unit is corrupt or that at least one of the data units in the group is corrupt. At 210, the data unit including the time-marker information is retransmitted based on the request for retransmission.

In an embodiment, the data unit is transmitted the first time without the time-marker information from the transmitter to the receiver while in the retransmission of the data unit the time-marker information is transmitted with the retransmitted data unit. This allows reducing the overhead of the data unit since no time-marker information has to be transmitted when the data unit is transmitted the first time but is only transmitted from the transmitter to the receiver when the data unit is retransmitted. In addition, a synergetic effect is achieved since the time-marker information provides for the receiver in addition a marker whether the data unit is transmitted in a first transmission or in a retransmission.

In embodiments, the time-marker information may be based on a sequence numbering of multicarrier symbols, i.e. a sequence of numbers or information which identifies the position of each multicarrier symbol in the sequence of the transmitted multicarrier symbols. The multicarrier symbol may for example be a DMT (Discrete multitone) symbol used in a DSL communication system.

In another embodiment, the time-marker information is based on a sequence numbering of codewords such as FEC (Forward error correction) codewords. In one embodiment, the codewords may be Reed-Solomon codewords.

The numbered sequence of multicarrier symbols or the numbered sequence of codewords can serve as a common time basis for both the transmitter and the receiver because the receiver and transmitter typically agree or at least may be able to agree which symbol number or which codeword is considered the first one when the data communication starts transmitting. Counting from then on gives a unique number to each multicarrier symbol or FEC codeword. It is to be noted that either of the two data block systems, i.e. the multicarrier symbol or the codewords can be used for the providing of the time-marker information. Therefore, the multicarrier symbol or the codeword may also be referred herein as a time base for the time-marker information. It is further to be noted that by using one of the two data block systems, i.e. the multicarrier symbol or the FEC codeword numbering system, a time base can be provided solely based on existing processing in the transmitter. In other words, no additional time base has to be implemented since the existing multicarrier symbols or FEC codeword sequences are used.

In the transmitter, all data units or data blocks received from a higher layer such as a bonding layer may be marked relative to the current time base number at the time of receiving.

The time-marker information may in embodiments be based on an anticipated sequence number of a transmit multicarrier symbol or an anticipated sequence number of a FEC codeword. In these embodiments, an expected or estimated sequence number rather than an actual sequence number is used for providing the time-marker information.

The time-marker information may be determined to be the sequence number of the multicarrier symbol the data unit is expected or estimated to be put in. Similar, in the embodiment using FEC codewords as time basis, the time-marker information may be determined to be the sequence number of the codeword the data unit is expected or estimated to be put in. In such embodiments, the time-marker information marks a time the data would be send over the link or line in case no additional delay is added.

Since the anticipated sequence number of the multicarrier symbol or the anticipated sequence number of the codeword is an expected or estimated sequence number, the time-marker is not influenced by any delay added prior to the generation of the multicarrier symbols or the FEC codeword symbols. In these cases the actual sequence number of the multicarrier symbol carrying the data unit or the actual codeword containing the data unit may be different than the expected multicarrier symbol or codeword because of the delay added prior to the generating of the multicarrier symbol or codeword.

According to an embodiment, the anticipated sequence number may be calculated based on an expected delay from a predetermined first point of the transmitter processing flow to a predetermined second point of the transmitter processing flow. The first point may be in one embodiment a so called gamma interface which separates in the process flow the layer 2 of the OSI model from layer 1 of the OSI model. As will be described in more detail, this allows providing a time-marker indicating with sufficient accuracy the point in time the data unit crossed the gamma interface. In embodiments the time-marker may be generated at the sublayer directly below the gamma interface or at other sublayers below the gamma interface which are hierarchically not directly subsequent to the gamma interface. Depending on whether the common time basis is the sequence numbering of the transmit multicarrier symbol or the sequence number of FEC code word, the second predetermined point may be different. In one case, the preselected second point may be a point in the process flow where the generating of the transmit multicarrier symbol starts. In another case, the preselected second point may be a point in the process flow where the FEC codeword generating starts. In these embodiments, the time-marker information corresponds to the expected time when the data unit would be processed in the multicarrier generator entity or in the FEC codeword generating entity which is about equal to the time when the data unit is expected to be transmitted over the link.

In other embodiments, the time-marker information may be the current counting value of the multicarrier symbol or the codeword. In these embodiments, the time-marker information indicates a current point of time. For example, if the multicarrier counter or the codeword counter is read out just when the data unit crosses the interface between the first and second layer (gamma interface), then this time-marker information indicates a point in time when the data unit has crossed the gamma interface.

Figure 3:
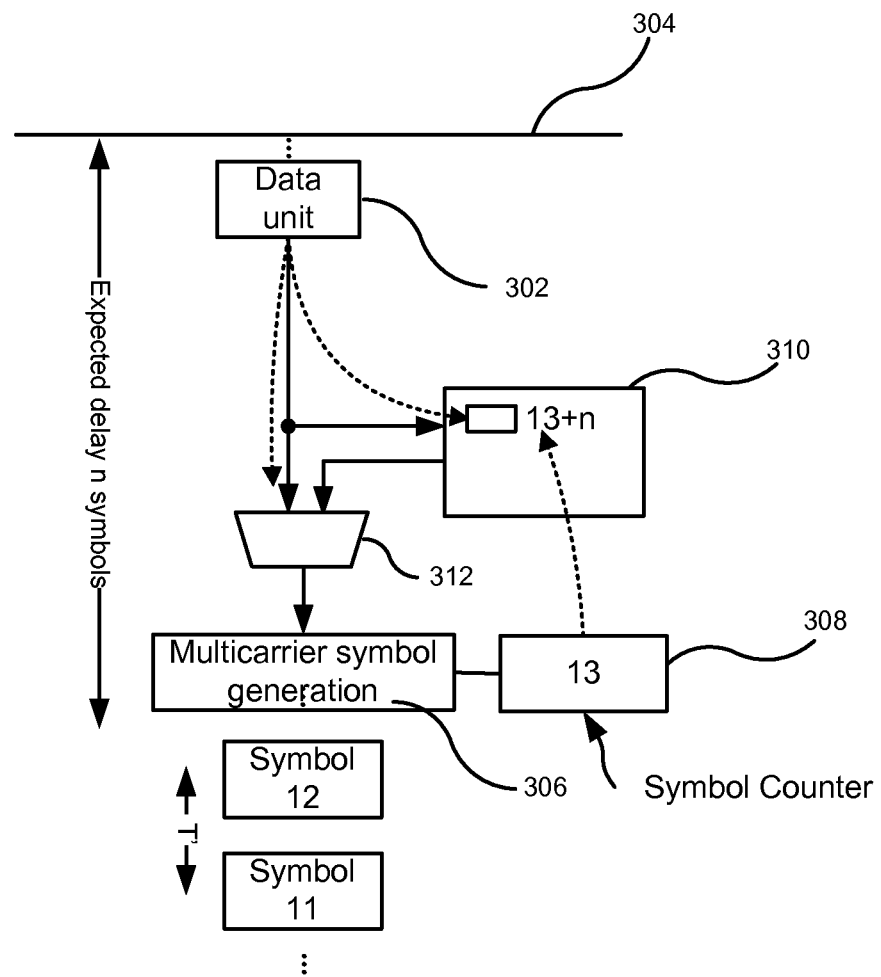
FIG. 3 shows a block diagram according to an embodiment of the present invention.

FIG. 3 shows an example to illustrate an embodiment when the time basis for the time marker information is based on the sequence numbering of multicarrier symbols. FIG. 3 shows a data unit 302 which has just crossed at the transmitter a first point 304 of the process flow. As described above, the first point may be for example the interface between layer 2 and layer 1 i.e. the gamma interface. At the same time, a symbol generator 306 is generating at this moment a multicarrier symbol having a sequence number 13 as indicated by a symbol counter 308. The symbol generator 306 is assumed in the described embodiment to output every time T one multicarrier symbol.

Between the first point 304 and the symbol generator 306, a multiplexer 312 is arranged. The data unit 302 is transferred to a first input of the multiplexer and copied into a retransmission buffer 310. A second input is coupled to the retransmission buffer 310 to multiplex data units into the process stream which have been requested for retransmission.

As indicated in FIG. 3, an expected transfer time or delay from the first point 304 to the symbol generator 306 is assumed in this embodiment to correspond to n multicarrier symbols. The expected delay depends on various parameters such as the type of processing which is provided between the first point 304, the hardware or firmware/software used for providing the processing etc. The expected delay time may be a predetermined stored parameter or may be a measured parameter stored by the device.

Since the expected transfer time is n multicarrier symbols and the symbol generator 306 is currently processing in the described embodiment the multicarrier symbol corresponding to sequence number 13, the anticipated sequence number of the multicarrier symbol to which the data unit is expected to be put in is equal to 13+n. The time-marker information is then stored in the retransmission buffer and linked to the data unit. It is to be noted that in other embodiments the adding of the expected time delay may not be performed. In these embodiments, the time-marker information which may be stored would then be the actually counter value, i.e. 13.

It is to be noted that when data units are requested for retransmission, these data units to be retransmitted are multiplexed into the process stream and provide fluctuations from the expected transfer time for the data unit. With the additional delay added from the retransmitted data units, the data unit may actually not be put into the expected multicarrier symbol 13+n but may be put into a later multicarrier symbol 13+n+x where x indicates the additional delay. However, since the stored time-marker information corresponds to the expected multicarrier symbol number and not the real multicarrier symbol number, the time-marker information stored in the retransmission buffer for the data unit is unaffected by any delay added from the retransmission multiplexed into the processing flow and provides still an indication of the time when the data unit has crossed or passed the first point 304 even though delay has been added between the first point 304 and the entity providing the time base, i.e. the symbol generator 306.

Figure 4:
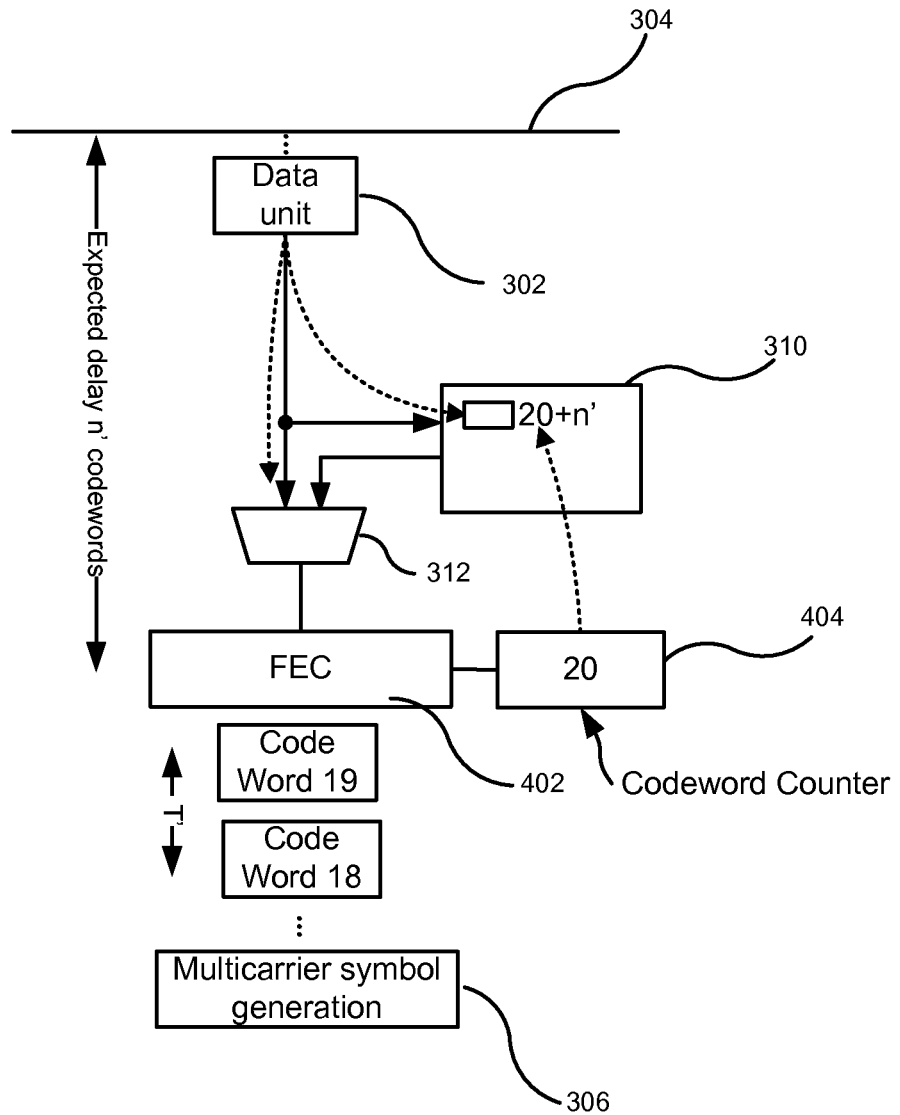
FIG. 4 shows a block diagram according to an embodiment of the present invention.

FIG. 4 illustrates an exemplary embodiment wherein the time base is based on a sequence numbering of FEC (forward error correction) codewords. As can bee seen in FIG. 4, between the symbol generator 306 and the multiplexer 312, a FEC codeword generator 402 is arranged outputting every time T' a codeword. As shown in FIG. 4, the data unit 302 has passed the first point 304 at the time the FEC codeword generator is processing the FEC codeword with sequence number 20 as indicated by a codeword counter 404. The expected delay or transfer time from the first point 304 to the FEC generator is assumed to be n'. Therefore, the time-marker information is calculated to 20+n' which is stored in the buffer 310.

As can be seen in the embodiments described above and other embodiments, the generating of the time-marker information is initiated based on the receiving of the data unit at a sublayer which is hierarchically higher than the sublayer which provides the timebase for the time-marker information. Retransmission data units may be multiplexed into the process flow between the hierarchically higher sublayer and the sublayer providing the timebase. However, as described above, the delay caused by the multiplexing of the retransmitted data units does not influence the time-marker marker. This allows in one embodiment the implementation of a bonding of communication links to determine at the receiver for the data units the point in time when the data unit should be transferred to the bonding layer independently whether it is a retransmitted data unit or a first time transmitted data unit and independent of any delay introduced by the multiplexing of data units in one data link which may cause a delay of the actual transmission time for one of the link.

In such an embodiment, a bonding entity or bonding layer may be provided to bond data links together for achieving higher transmission bandwidth. For example if two links are bonded, the bonding entity may receive the data to be transmitted and distributes data units to a first processing path associated with the first link and a second processing path associated with the second link. A first time-marker information is then provided for a data unit distributed to the first processing path and a second time-marker information is provided for a data unit distributed to the second processing path. The data units are then transmitted over the first and second link, respectively. In case the receiver receives corrupt data or in other cases where a retransmission is needed, a request for retransmission may be transmitted from the receiver to the transmitter for each link. Based on the request for retransmission transferred in a backchannel over the first link, the data unit including now the first time-marker information is retransmitted. In other cases based on a request for retransmission transferred on a backchannel of the second link, the corresponding data unit including now the second time-marker information is retransmitted to the receiver.

At the receiver, the time-marker information of the received retransmitted data unit is checked. A point in time for transferring the retransmitted data unit to a hierarchical higher sublayer for example the bonding layer is then determined based on the time-marker information and the retransmitted data unit is then transferred to the hierarchically higher sublayer based on the determined point in time. The point in time for transferring to the hierarchically higher sublayer may for example be calculated by using a predetermined delay between the receiver and the transmitter. The receiver adds this delay to the time-marker information in order to determine the point in time to transfer the data unit. In other embodiments, processing delays at the receiver and/or at the transmitter which may be pre-known or predetermined may be taken into account.

Figure 5A:
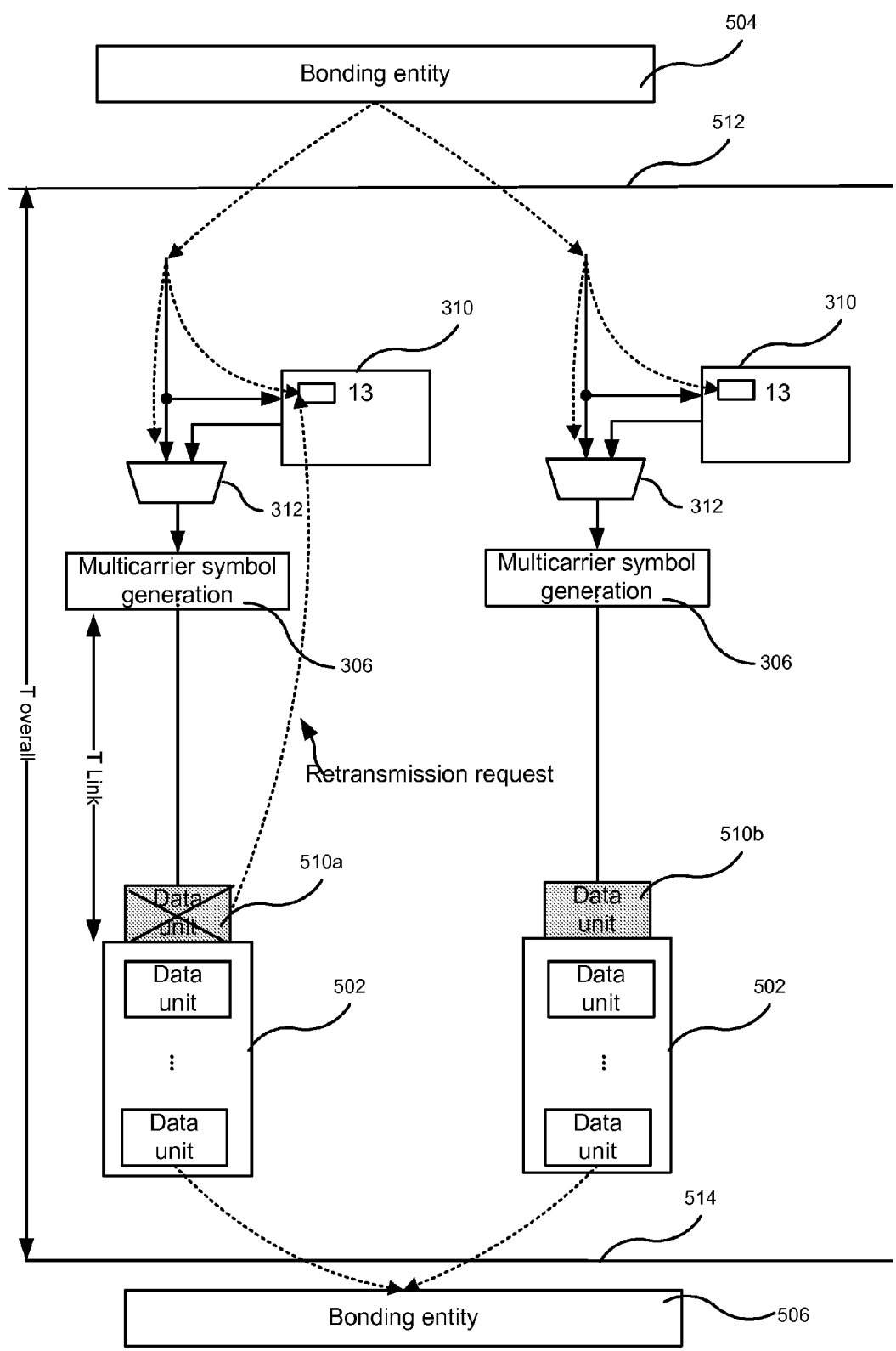
FIGS. 5a and 5b show an embodiment of the present invention.
Figure 5B:
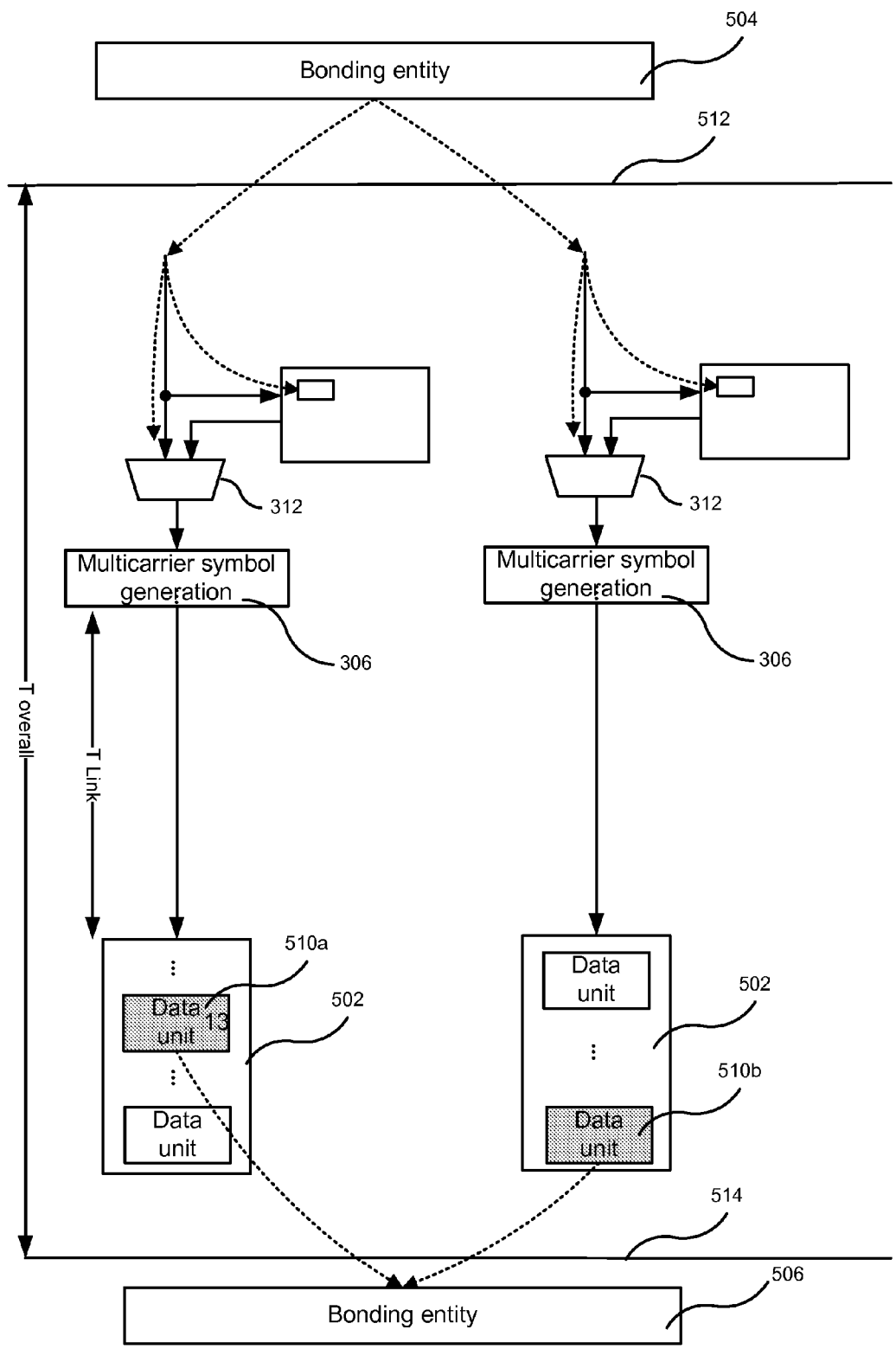

FIGS. 5a and 5b show one embodiment implementing a bonding of two communication links. At the transmitter side, a bonding entity or bonding layer 504 is implemented to distribute the data units amongst the two communication links. The bonding entity is implemented in this embodiment directly above a gamma interface 512 at the transmitter. The bonding entity 504 provides a sequence numbering for each distributed data unit which is used at a bonding entity at the receiver for assembling the data units in the same sequence. In one embodiment, the sequence numbering is referred to as SID (sequence identifier).

The sequence numbering can be used to identify lost data units at the receiver and to identify gaps by monitoring the SID. The missing numbers are requested for retransmission the data unit corresponding to the missing number. In one embodiment, if it is determined that data units are lost or corrupted, the last correctly received data unit may be indicated to the transmitter in order to request retransmission. In some cases, because the retransmitted data units are multiplexed together with the first transmitted data units which destroys an order of the sequence, the receiver may not exactly known whether retransmission should be requested or not because the received sequence numbers of first transmitted data units are mixed up with retransmitted data units. It is to be noted that by inserting the time-marker information only for the retransmitted data units and not for the first transmitted data units, the time-marker information also provides an indication whether the received data unit is a retransmitted data unit or not. This allows the receiver to take for generating a retransmission request into account whether the received data units are retransmitted or first transmitted when analyzing a received sequence of data units.

Each of the communication links stores at the receiver side the distributed data units together with the time-marker information as described above. The data units are then transmitted to the receiver side. Each receiver side has a retransmission buffer 502 to buffer the received data units and a receiver bonding entity 506. The receiver bonding entity is provided in this embodiment hierarchically directly above the gamma interface 514. The data units are transferred from the retransmission buffer to the bonding entity where they are aggregated to one data stream. Typically, at the bonding entity buffers are used to buffer the data units for each link in order to compensate delay variations that are inherent in the data communication system plus a mismatch in the permanent delays between the bonded links due to unknown components of the delay. In some communication systems such as DSL communication systems, the buffers at the receiver bonding entity 506 may have only a small capacity for example 15 Kbits. Therefore, in order to allow the aggregating, the data units at each link are transferred to the receiver bonding entity 506 in approximately the same sequence order in which the data units have been distributed by the bonding entity 504 at the transmitter. Or in other words, the delay between the transmitter and receiver is made constant for both links independently whether the data units are received at one or both of the links for the first time, or are retransmitted or multiple time retransmitted. In case of retransmission on one link, the data unit which had to be retransmitted one or more times has a significant delay to the data unit transmitted on the other link. With the above described time-marker information, the transfer of the data units for each link at approximately the required time to the receiver bonding entity 506 independent of any delay added by retransmission can be achieved. Furthermore, the above described embodiments allow implementing the constant delay without any changes of sublayers hierarchically above the gamma layer, i.e. without any change of the bonding entity.

In addition to this, by implementing the retransmission using the above described time-marker information, it is possible to use the sequence numbering of the bonding layer to identify missing data units. This is achieved since the inclusion of the time-marker information indicates that the data unit is a retransmitted unit. The receiver can easily distinguish between first time transmitted data units and retransmitted data units and can take this into account when determining the data units which are to be retransmitted.

To illustrate the above in more detail, FIG. 5a shows a situation when two data unit 510a and 510b which have been distributed by the transmitter bonding entity 504 at the same time are received at the receiver. While the second link receives the data unit 510b correctly, the data unit 510a at the second link is corrupted. This requires a retransmission of the data unit 510a causing additional delay as shown in FIG. 5b. In FIG. 5b, the correctly received data unit 510b is just scheduled to be transferred to the receiver bonding entity 506 while the data unit 510a would be delayed compared to the data unit 510b because it has been retransmitted. However, because the retransmitted data unit 510a contains the time-marker information, it can be identified to be transferred at the same time instant as the data unit 510b based on the calculation of a transfer point of time.

With the time-marker information, the delay on the line can be made constant. When the delay on the line is made constant, the delay from bonding entity to bonding entity or from gamma interface to gamma interface can be made also constant. At the receiver the delay from the receiving of the data unit on the link to the transferring of the data unit over the gamma interface to the bonding entity is constant or can be made constant. The receiver can easily calculate then correct transfer time for the retransmitted data unit based on the included time marker by using the parameters of the link-to-link delay which is assumed to be constant for both links and/or the parameters of the gamma-to-gamma delay which may also be assumed to be constant for both links. In addition thereto, processing delays within the receiver and/or transmitter can be taken into account.

The received data units are buffered at the receiver and are forwarded to the receiver bonding layer at a point in time T1=T0+DL where DL is a predetermined or predefined gamma-to-gamma layer which is equal for all links in the bonded group and T0 is the point of time the data unit has crossed the gamma interface 512 of the transmitter.

Figure 6:
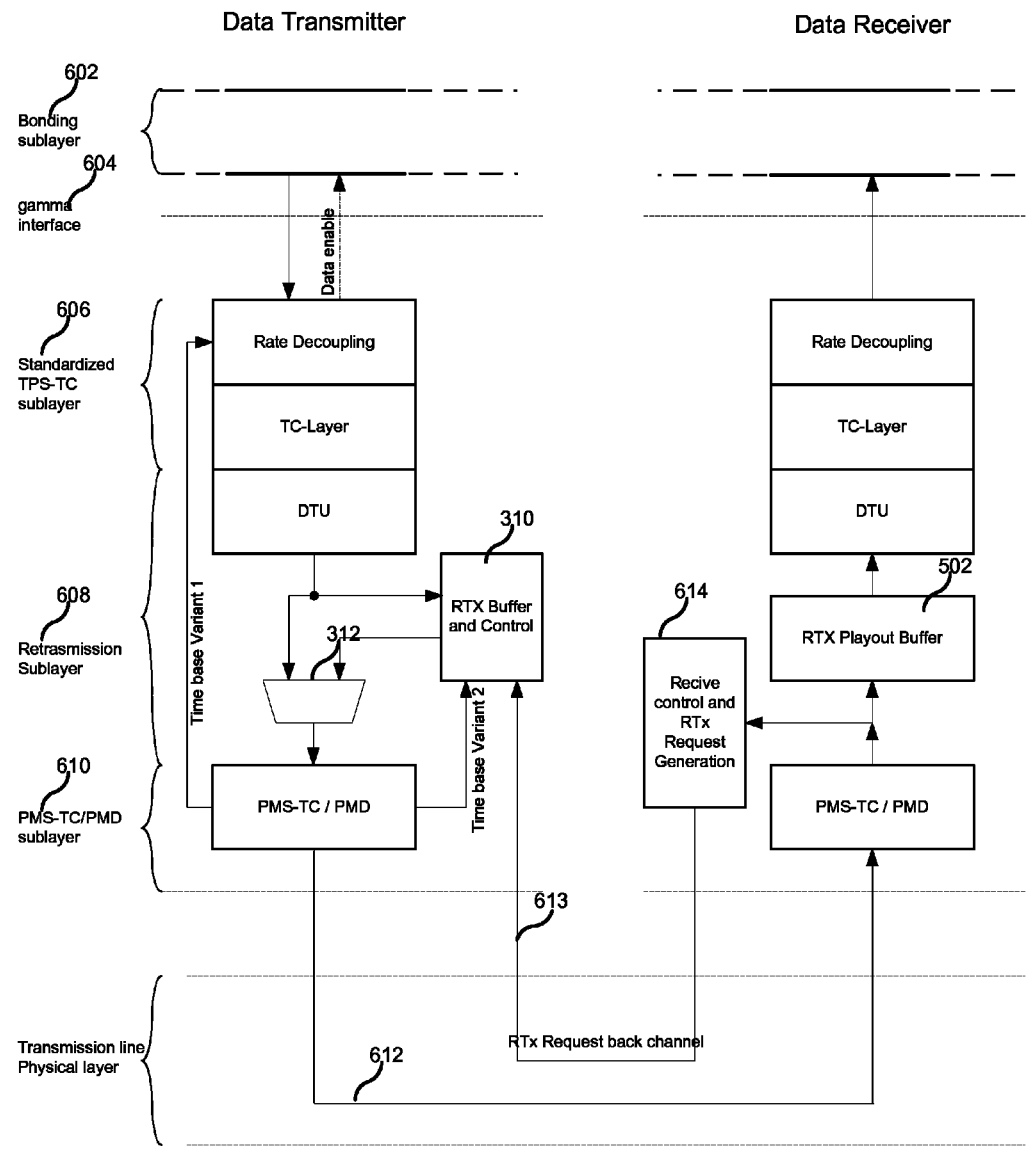
FIG. 6 shows a block diagram according to an embodiment of the present invention.

FIG. 6 shows one embodiment of a DSL system implementing retransmission and bonding as described above. A bonding sublayer 602 is implemented above a gamma interface 604. Data units are provided to TPS-TC (transmission protocol specific-transmission convergence) sublayers 606 which are already implemented in existing DSL systems. The TPS-TC layer provides functionality such as packetizing into frames, organizing of the bearer channels, multiplexing. The TPS-TC sublayers 606 include a rate decoupling and a TC (Transmission convergence)-layer. A retransmission sublayer 608 is implemented hierarchically below the TC-sublayer. In other embodiments, the retransmission sublayer may be implemented in other positions of the protocol stack for example in a PMS-TC (physical media specific—transmission convergence) layer of a TC-layer. In the retransmission sublayer, the storing of the data units in the retransmission buffer 310 and the multiplexing of the retransmitted data units into the data stream by multiplexer 312 is implemented.

PMS-TC and PMD (Physical media dependent) sublayers are shown in FIG. 6 with reference number 610. These sublayers include the FEC codeword generation and the multicarrier symbol generation which provide in embodiments the time basis for the time-marker information.

The receiver side is connected to the transmitter side by a link 612. At the receiver side, the complementary stack is implemented. The retransmission sublayer implements at the receiver a receive control and retransmission request generation indicated in FIG. 6 by a block 614. Block 614 is connected to the buffer 310 of the transmitter by a back-channel 613 for transferring retransmission requests from the receiver to the transmitter. Furthermore, the retransmission sublayer implements the retransmission buffer 502 which stores the received data units until they are transferred to the higher sublayers. It is to be noted that in the embodiment of FIG. 6 the time-marker information may be generated in each of the sublayers above the multiplexer 312. Based on the receiving of the data unit at any of the layers, the current count number may be looked up and used for providing the time-marker information as described above.

Figure 7:
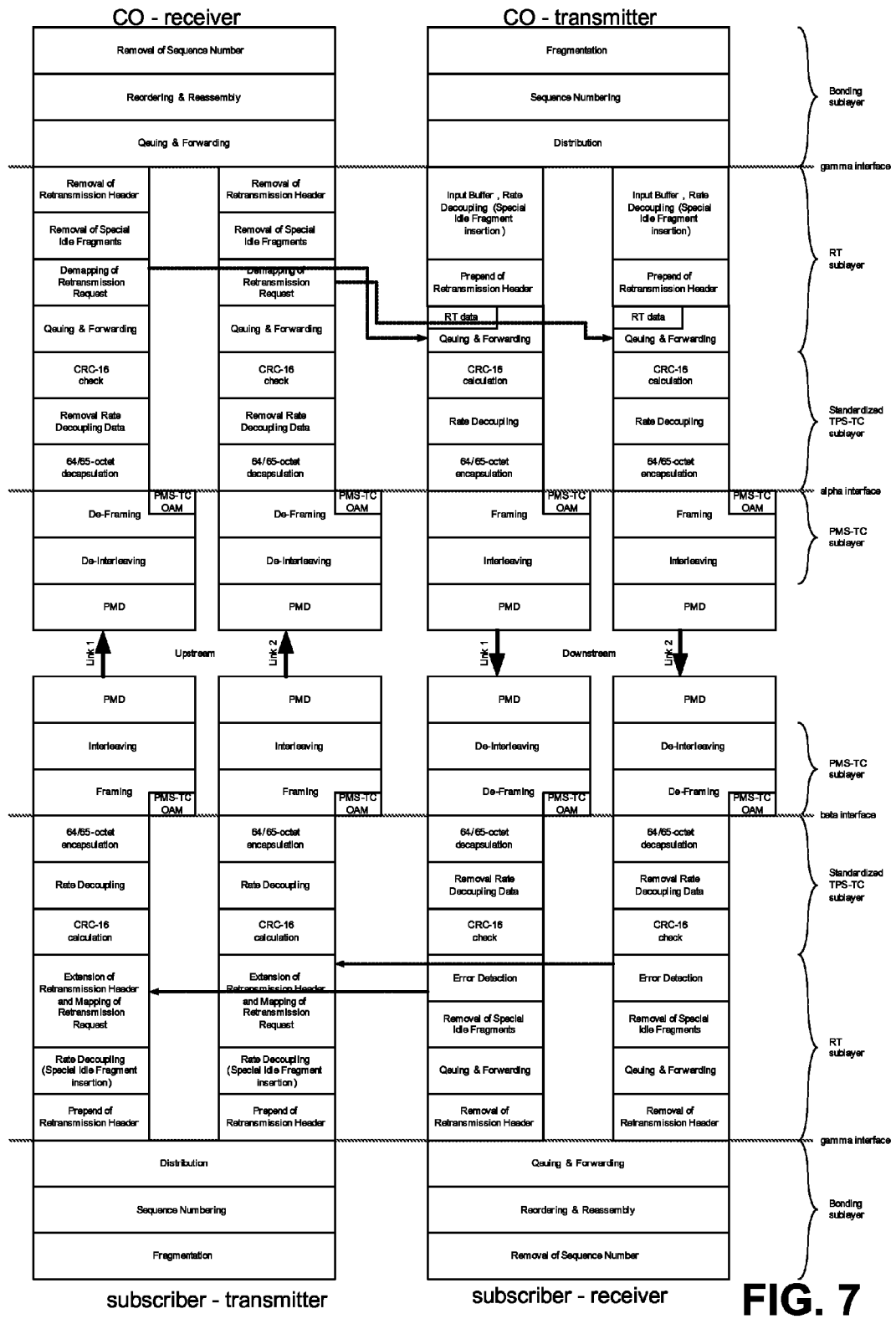
FIG. 7 shows a layer model according to an embodiment of the present invention.

The retransmission functionality may in embodiments be implemented in various sublayers of the first layer (PHY layer). FIG. 7 shows one embodiment wherein the retransmission functionality is implemented in a sublayer directly below the gamma interface.

FIG. 7 shows an embodiment of a protocol stack for bonding with two links and retransmission for downstream data where queuing and forwarding of the retransmission sublayer transmitter wherein the retransmission sublayer is located directly below the distribution of the bonding sublayer transmitter. In more detail, FIG. 7 shows a protocol stack for a receiver and transmitter which may be implemented at the Central Office (CO) site and at the subscriber site (remote site), respectively. The protocol stack of the CO receiver comprises a bonding layer directly above the gamma interface including fragmentation, sequence numbering and distribution of the data units. The retransmission sublayer is located directly below the gamma interface and includes an input buffer, rate decoupling functionality which decouples the two data links by inserting of a special type of idle fragments. Furthermore, the retransmission sublayer includes functionalities to generate and prepend the retransmission headers and a queuing and forwarding functionality.

In the TPS-TC sublayer (Transmission Protocol Specific-Transmission Convergence), a CRC-16 (Cyclic Redundant Check-sum), a rate decoupling entity and a 64/65 octet encapsulation entity is provided. The rate decoupling entity fills each TPS-TC encapsulation structure (in case of 64/65-octet TPS-TC it fills each 65-byte structure) with idle bits if data fragments are not fully occupied with user data in order to decouple the data rates of the two links. If a data fragment is fully occupied with idle bits, indication can be provided to the data fragment in order to avoid unnecessary retransmission of the non-useful data. The CRC-16 calculation entity provides CRC-16 calculation based on packet start and packet end identification provided in some of the data fragments. The 64/65 octet encapsulation entity provides 64/65 octet encapsulation as is known to a person skilled in the art.

In the PMS-TC sublayer, a framing entity and an interleaving entity is provided together with a PMS-TC layer OAM (Operation and Maintenance) entity to provide OAM channel communication at PMS-TC level. Finally a PMD (Physical Medium Dependent) sublayer is provided.

As can be seen in FIG. 7, each of the above described entities of the PMS-TC and TPS-TC sublayers are provided for each of the subscriber lines.

At the subscriber site, a protocol stack having the reverse sequence of the protocol stack is provided in order to implement a receiver protocol stack. It is to be understood for a person skilled in the art that functionalities such as the interleaver framing and rate coupling are replaced at the receiver site by the complementary functionality.

As can be seen in FIG. 7, error detection is provided at the receiver protocol stack of the subscriber site to detect corrupt received data units. By using the sequence numbering provided by the bonding layer at the Central Office site, a line specific error detection is capable of identifying the corrupt data units and to request retransmission for the corrupt or missed data units. As can be seen in FIG. 7, the sequence number information may be provided from the protocol stack for each of the subscriber lines to the OAM data entities of the transmitter protocol stacks for each subscriber line to allow transmitting of a retransmission request including the sequence number information over both subscriber lines back to the Central Office. At the Central Office, error detection is not implemented at the receiver protocol stack of the Central Office since in this embodiment retransmission protection is provided only in downstream direction. At the Central Office, the retransmission request is processed. A sublayer for demapping of the retransmission request is provided which transfers the sequence number identified for retransmission to the queuing and forwarding entity in order to start the retransmitting of the data units which are identified as corruptly received.

It is to be noted that the layer model shown in FIG. 7 is only one of many examples of implementing retransmission as described above in a layer model. Therefore, other embodiments provide other layer models for implementing the retransmission at other sublayers, for example at the PMS-TC layer.

While FIG. 7 shows one embodiment with a PMS-TC layer for Ethernet packets, it may be noted that other layer models may use a PMS-TC layer for ATM cells. In this case, some modification may be provided. For example, while in the PMS-TC layer for Ethernet packets the basic retransmission unit may be a fragment of the Ethernet packet or a plurality of fragments, for ATM cells the basic retransmission unit may be an ATM cell or a plurality of ATM cells.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. Furthermore the terms "coupled" or "connected" may be interpreted in a broad sense not only covering direct but also indirect coupling. The term "entity" may in embodiments include any device, apparatus, circuit, hardware, software, software modules, firmware, firmware modules, chips or other semiconductors as well as logical units or physical implementations of protocol layers as well as parts of same. Furthermore, it is to be noted that two or more entities may in embodiments be implemented in a single device, single apparatus, single circuit, single hardware, single software, single software modules, single firmware, single firmware modules, single chip as well as single logical units or physical implementations of protocol layers.

The accompanying drawings that form a part hereof show by way of illustration, and not of limitation, specific embodiments in which the subject matter may be practiced.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
generating at a DSL transmitter time-marker information for a data unit, wherein generating at the DSL transmitter time-marker information includes generating time-marker information based on an anticipated sequence number of a transmit multicarrier symbol or an anticipated sequence number of a FEC codeword, wherein the anticipated sequence number is calculated based on an expected delay from a predetermined first point of a transmitter processing flow to a predetermined second point of the transmitter processing flow;
generating at the DSL transmitter a sequence ID for the data unit;
storing the time-marker information at the DSL transmitter;
transmitting the data unit together with the sequence ID from the DSL transmitter to a DSL receiver;
transmitting a request for retransmission from the DSL receiver to the DSL transmitter; and
based on the request, retransmitting the data unit including the time-marker information from the DSL transmitter to the DSL receiver.

2. The method according to claim 1, wherein the transmitting of the data unit from the DSL transmitter to the DSL receiver comprises: transmitting the data unit without the time-marker information from the DSL transmitter to the DSL receiver.

3. The method according to claim 1, wherein the time-marker information is generated based on a number of transmitted data bits, or based on a sequence number of a currently generated transmit multicarrier symbol, or based on a sequence number of a currently processed FEC codeword.

4. The method according to claim 1, wherein the generating of the time-marker information is initiated based on a receiving of the data unit at a sublayer hierarchically higher than the sublayer which provides a timebase for the time-marker information, and wherein retransmission data units are multiplexed into a process flow between the hierarchically higher sublayer and the sublayer providing the timebase for the time-marker information.

5. The method according to claim 4, wherein the timebase for the time-marker information is derived from subsequent numbering of data bits, or subsequent numbering of multicarrier symbols or subsequent numbering of FEC codewords.

6. The method according to claim 1, further comprising:
receiving at a bonding layer data to be transmitted, the bonding layer being provided for bonding of a first link and a second link;
distributing the data unit to a first processing path associated with the first link and a further data unit to a second processing path associated with the second link;
providing a first time-marker information for the data unit distributed to the first processing path and providing a second time-marker information for the further data unit distributed to the second processing path;
transmitting the data unit and the further data unit over the first and second link, respectively;
based on a request for retransmission on the first link, retransmitting the data unit including the first time-marker information and based on a request for retransmission on the second link, retransmitting the further data unit including the second time-marker information.

7. The method according to claim 1, further comprising:
receiving the retransmitted data unit at the DSL receiver;
determining a point in time for transferring the retransmitted data unit to a hierarchical higher sublayer of the DSL receiver based on the time-marker information;
transferring the retransmitted data unit to the hierarchical higher sublayer based on the determined point in time.

8. The method according to claim 7, wherein the hierarchical higher sublayer is a bonding layer for bonding a first and second DSL link.

9. The method according to claim 7, wherein the determined point in time approximately equals a point in time when the data unit would have been transferred to the hierarchical higher sublayer when no retransmission would have occurred.

10. A DSL transmitter device comprising:
a first entity configured to generate time-marker information for a data unit, wherein the first entity is configured to generate the time-marker information based on an anticipated sequence number of a transmit multicarrier symbol or an anticipated sequence number of a FEC codeword, wherein the first entity is configured to calculate the anticipated sequence number based on an expected delay from a predetermined first point of a processing flow to a predetermined second point of a processing flow in the device;

a second entity configured to generate a sequence ID for a data unit;
a buffer to store the time-marker information at the device;
a third entity configured to initiate transmission of the data unit with the sequence ID over a subscriber line; and
a fourth entity configured to initiate retransmission of the data unit including the time-marker information over the subscriber line based on a request for retransmission.

11. The device according to claim 10, wherein the third entity is configured to initiate a transmission of the data unit over the subscriber line without the time-marker information.

12. The device according to claim 10, wherein the first entity is configured to generate the time-marker information based on a sequence number of a transmit multicarrier symbol currently processed in a multicarrier symbol processing or based on a sequence number of a FEC codeword currently processed in a FEC processing.

13. The device according to claim 10, wherein the device is configured to initiate the generating of the time-marker information based on the receiving of the data unit at a sublayer hierarchically higher than the sublayer which provides the timebase for the time-marker information, and wherein retransmission data units are multiplexed into the process flow between the hierarchically higher sublayer and the sublayer providing the timebase for the time-marker information.

14. The device according to claim 10, wherein a timebase for the time-marker information is derived from subsequent numbering of multicarrier transmit symbols or from a subsequent numbering of FEC codewords.

15. The device according to claim 10, further comprising:
a bonding entity, the bonding entity being provided for bonding of a first link and a second link;
wherein the bonding entity is configured to distribute the data unit to a first processing path associated with the first link and a further data unit to a second processing path associated with the second link;
wherein the first entity is configured to provide a first time-marker information for the data unit distributed to the first processing path and a second time-marker information for the further data unit distributed to the second processing path; wherein the third entity is configured to initiate transmission of the data unit and the further data unit over the first and second link, respectively; and
wherein the fourth entity is configured to initiate retransmitting the data unit including the first time-marker information based on a request for retransmission on the first link, and to initiate retransmission of the further data unit including the second time-marker information based on a request for retransmission on the second link.

16. A DSL system comprising:
a DSL transmitter device, the DSL transmitter device comprising:
a first entity to generate time-marker information for a data unit;
a second entity to generate a sequence ID for the data unit;
a first buffer to store the time-marker information at the DSL transmitter device;
a third entity to initiate transmission of the data unit including the sequence ID;
an input to receive a request for retransmission of the data unit; and
a fourth entity to initiate retransmission of the data unit including the time-marker information; and
a DSL receiver device, the DSL receiver device comprising:
a first input to receive the data unit including the sequence ID transmitted from the DSL transmitter device to the DSL receiver device;
a second buffer to store the received data unit;
a fifth entity to calculate a point in time to transfer the data unit to a higher sublayer in a processing flow, wherein the first entity is configured to calculate the point in time based on the time-marker information included in the retransmitted data unit;
wherein the second buffer is configured to store the received data unit until the determined point in time after the point in time has been determined and to delay the transfer of the received data unit until the determined point in time.

* * * * *